United States Patent [19]

Chang et al.

[11] Patent Number: 5,554,701
[45] Date of Patent: Sep. 10, 1996

[54] CROSSLINKED POLYESTERS MADE FROM DECAHYDRONAPHTHALENE DIMETHANOL

[75] Inventors: Yeong-Ho Chang; Robert B. Barbee; Brian S. Phillips, all of Kingsport, Tenn.

[73] Assignee: Eastman Chemical Company, Kingsport, Tenn.

[21] Appl. No.: 409,399

[22] Filed: Mar. 24, 1995

[51] Int. Cl.6 ............... C08F 20/00; C08G 63/44
[52] U.S. Cl. ............ 525/437; 525/438; 525/440; 528/288; 528/289; 528/307; 528/308; 528/297; 428/482
[58] Field of Search .................. 525/437, 438, 525/440; 528/288, 289, 307, 308, 297; 428/482

[56] References Cited

U.S. PATENT DOCUMENTS

| | | | |
|---|---|---|---|
| 3,313,777 | 4/1967 | Elam et al. | 260/47 |
| 4,256,788 | 3/1981 | Gras | 428/35 |
| 4,363,908 | 12/1982 | Joyner et al. | 528/302 |
| 4,474,918 | 10/1984 | Seymour et al. | 528/190 |
| 4,525,504 | 6/1985 | Morris et al. | 524/99 |
| 4,910,292 | 3/1990 | Blount | 528/272 |
| 5,097,006 | 3/1992 | Kapilow et al. | 528/272 |
| 5,143,984 | 9/1992 | Jenkins et al. | 525/437 |
| 5,242,967 | 9/1993 | Minnick | 525/444 |
| 5,373,084 | 12/1994 | Chang | 525/437 |

FOREIGN PATENT DOCUMENTS 962913  7/1964  United Kingdom .

Primary Examiner—Melvyn I. Marquis
Assistant Examiner—Randy Gulakowski
Attorney, Agent, or Firm—Bernard J. Graves, Jr.; Harry J. Gwinnell

[57] ABSTRACT

This invention provides weatherable thermosetting powder coatings based on an all-aliphatic polyester comprised of residues of 1,2-cyclohexanedicarboxylic acid, 1,3-cyclohexanedicarboxylic acid, or 1,4-cyclohexanedicarboxylic acid and 2,6-decahydronaphthalene dimethanol. The polyester may be predominantly hydroxyl or carboxyl functional. Coating compositions prepared therefrom provide coatings which exhibit superior weatherability.

18 Claims, No Drawings

CROSSLINKED POLYESTERS MADE FROM DECAHYDRONAPHTHALENE DIMETHANOL

FIELD OF THE INVENTION

This invention belongs to the field of powder coatings. More particularly, this invention relates to powder coatings comprised of a polyester resin having residues of 1,2-, 1,3-, or 1,4-cyclohexanedicarboxylic acid and 2,6-decahydronaphthalene dimethanol.

BACKGROUND OF THE INVENTION

Plastic materials used in the manufacture of powder coatings are classified broadly as either thermosetting or thermoplastic. In the application of thermoplastic powder coatings, heat is applied to the coating on the substrate to melt the particles of the powder coating and thereby permit the particles to flow together and form a smooth coating.

Thermosetting coatings, when compared to coatings derived from thermoplastic compositions, generally are tougher, more resistant to solvents and detergents, have better adhesion to metal substrates and do not soften when exposed to elevated temperatures.

Resins that exhibit good weatherability and meet the basic Tg (glass transition temperature) requirements for powder coatings are becoming increasingly important, particularly for outdoor applications.

Powder coatings based on acrylic resins are known to have excellent weathering performance but costs are generally higher.

British Patent No. 962,913 discloses polyesters containing cyclohexanedicarboxylic acid (CHDA) and 2,2,4,4-tetramethylcyclobutane-1,3-diol useful as film and molding plastics.

U.S. Pat. No. 3,313,777 discloses polyesters containing CHDA and 2,2,4,4-tetramethyl-1,3-cyclobutanediol useful as film and molding plastics.

U.S. Pat. No. 4,363,908 discloses copolyesters containing CHDA and 2,2,4,4-tetramethyl-1,3-cyclobutanediol useful as adhesives.

U.S. Pat. No. 4,525,504 discloses stabilized polyesters with improved weatherability based on CHDA and 2,2,4,4-tetramethyl-1,3-cyclobutanediol. These polyesters are high molecular weight polyesters useful in molding plastics.

U.S. Pat. No. 5,097,006 discloses all-aliphatic polyester resins based on 1,4-cyclohexanedicarboxylic acid and hydrogenated bisphenol A and/or cycloaliphatic diols, useful as weatherable powder coating resins.

SUMMARY OF THE INVENTION

This invention provides weatherable thermosetting powder coatings based on a polyester comprised of 1,2-cyclohexanedicarboxylic acid, 1,3-cyclohexanedicarboxylic acid, or 1,4-cyclohexanedicarboxylic acid and 2,6-decahydronaphthalene dimethanol. The coatings of this invention may be hydroxyl functional and utilize crosslinkers such as blocked polyisocyanates, tetramethoxymethyl glycoluril or melamine derivatives, or be carboxyl functional and utilize a crosslinker such as triglycidylisocyanurate (TGIC) or an activated Beta-hydroxylalkylamide such as bis(N,N-dihydroxyethyl)adipamide.

DETAILED DESCRIPTION OF THE INVENTION

This invention provides thermosetting powder coating compositions comprised of a polyester comprised of at least 80 weight percent of residues selected from the group consisting of residues of 1,2-cyclohexanedicarboxylic acid, 1,3-cyclohexanedicarboxylic acid, or 1,4-cyclohexanedicarboxylic acid and at least 80 weight percent of 2,6-decahydronaphthalene dimethanol. The polyester may be modified with other aliphatic diacids or aliphatic diols but must have a high enough glass transition temperature (Tg) to be useful in powder coatings. We have found that this aliphatic polyester meets the basic Tg requirement of powder coatings and found that it provides powder coating with excellent weatherability. The polyester resin has a number average molecular weight (Mn) of from about 1,500 to about 10,000, preferably from about 2,000 to 6,,000 and a glass transition temperature (Tg) of about 45° C. to 100° C., preferably 50° to 70° C. and a hydroxyl or an acid number of from about 20 to about 100, preferably from about 30 to about 80.

Thus, the present invention provides a thermosetting powder coating composition comprising A) an aliphatic polyester comprised of 80 to 100 weight percent of residues selected from the group consisting of 1,2-cyclohexanedicarboxylic acid, 1,3-cyclohexanedicarboxylic acid, or 1,4-cyclohexanedicarboxylic acid and from about 80 to 100 weight percent of residues of 2,6-decahydronaphthalene dimethanol, and having a number average molecular weight (Mn) of from about 1,500 to about 10,000, a glass transition temperature (Tg) of about 45° C. to 100° C., and hydroxyl or acid number of from about 20 to about 100; and B) a crosslinking effective amount of a crosslinker reactive with said polyester.

In a preferred embodiment of the present invention there is provided a thermosetting powder coating composition comprising A) a carboxyl polyester resin as described above; and B) a weatherable epoxy crosslinker such as triglycidylisocyanurate (TGIC) commercially available as ARALDITE™ PT-810 by Ciba Geigy or a Beta-hydroxylalkyl amide such as Bis(N,N-dihydroxyethyl)adipamide commercially available from Rohm and Haas as PRIMID™ XL552;

or

A) a hydroxyl polyester resin as described above; and

B) a blocked polyisocyanate crosslinker or a crosslinker from the glycoluril family of "aminoplast" crosslinking agents, such as tetramethoxymethyl glycouril commercially available as POWDERLINK™ 1174.

In a further preferred embodiment, the polyester (A) is comprised of from about 90 to about 100 weight percent of residues selected from the group consisting of residues of 1,2-cyclohexanedicarboxylic acid, 1,3-cyclohexanedicarboxylic acid, and 1,4-cyclohexanedicarboxylic acid and from about 90 to about 100 weight percent of residues of 2,6-decahydronaphthalene dimethanol. The remaining percent of dicarboxylic acid and polyol residues can be selected from other known aliphatic polyol and aliphatic diacid residues.

Examples of such polyols includes polyester polyol branching agents such as trimethylolpropane, trimethylolethane, glycerol, and the like. Other examples of suitable polyols include 1,4-butanediol, ethylene glycol, propylene glycol, 1,3-propanediol, 2,4-dimethyl-2-ethylhexane-1,3-diol, 2,2-dimethyl-1,3-propanediol, 2-ethyl-2-butyl-1,3-propanediol, 2-ethyl-2-isobutyl-1,3-propanediol, 1,3-butanediol, 1,5-pentanediol, 1,6-hexanediol, thiodiethanol, 1,2-, 1,3- and 1,4-cyclohexanedimethanol, 2,2,4,4-tetramethyl-1,3-cyclobutanediol, hydrogenated bisphenol A, 1,4-xylylenediol and the like.

Preferably the other dicarboxylic acid residues of the polyesters are selected from residues of terephthalic acid, isophthalic acid or phthalic acid; oxalic; malonic, dimethylmalonic; succinic; glutaric; adipic; trimethyladipic; pimelic, 2,2-dimethylglutaric; azelaic; sebacic; fumaric; maleic; and itaconic acids.

As used herein, the terms "hydroxyl-functional" and "carboxyl-functional" as used to describe the polyester component (A) is used in its ordinary art-recognized meaning. In other words, such terms denote whether the polyester (or binder) is predominantly carboxyl- or hydroxyl-functional in character, thereby dictating the choice of crosslinker. In such a case, for example, a hydroxyl functional resin will have an acid number of less than about 15 (and a hydroxyl number of 20 to 100) and a carboxyl functional resin will have a hydroxyl number of less than about 15 (and a carboxyl or acid number of 20 to 100).

The most readily-available, and thus the preferred, blocked isocyanate cross-linking agents or compounds are those commonly referred to as ε-caprolactam-blocked isophorone diisocyanate, e.g., those described in U.S. Pat. Nos. 3,822,240, 4,150,211 and 4,212,962, incorporated herein by reference. However, the products marketed as ε-caprolactam-blocked isophorone diisocyanate may consist primarily of the blocked, difunctional, monomeric isophorone diisocyanate, i.e., a mixture of the cis and trans isomers of 3-isocyanatomethyl-3,5,5-trimethylcyclohexylisocyanate, the blocked, difunctional dimer thereof, the blocked, trifunctional trimer thereof or a mixture of the monomeric, dimeric and/or trimeric forms. For example, the blocked polyisocyanate compound used as the cross-linking agent may be a mixture consisting primarily of the ε-caprolactam-blocked, difunctional, monomeric isophorone diisocyanate and the ε-caprolactam-blocked, trifunctional trimer of isophorone diisocyanate. The description herein of the cross-linking agents as "blocked isocyanates" refers to compounds which contain at least two isocyanato groups which are blocked with, i.e., reacted with, another compound, e.g., ε-caprolactam. The reaction of the isocyanato groups with the blocking compound is reversible at elevated temperatures, e.g., normally about 150° C., and above, at which temperature the isocyanato groups are available to react with the hydroxyl groups present on the free hydroxy groups of the polyester to form urethane linkages.

Alternatively, the blocked isocyanate may be a cross-linking effective amount of an adduct of the 1,3-diazetidine-2,4-dione dimer of isophorone diisocyanate and a diol having the structure

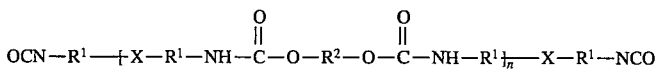

wherein
$R^1$ is a divalent 1-methylene-1,3,3-trimethyl-5-cyclohexyl radical, i.e., a radical having the structure

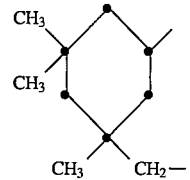

$R^2$ is a divalent aliphatic, cycloaliphatic, araliphatic or aromatic residue of a diol; and X is a 1,3-diazetidine-2,4-dionediyl radical, i.e., a radical having the structure

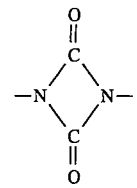

wherein the ratio of NCO to OH groups in the formation of the adduct is about 1:0.5 to 1:0.9, the mole ratio of diazetidinedione to diol is from 2:1 to 6:5, the content of free isocyanate groups in the adduct is not greater than 8 weight percent and the adduct has a molecular weight of about 500 to 4000 and a melting point of about 70° to 130° C.

The adducts of the 1,3-diazetidine-2,4-dione dimer of isophorone diisocyanate and a diol are prepared according to the procedures described in U.S. Pat. No. 4,413,079, incorporated herein by reference, by reacting the diazetidine dimer of isophorone diisocyanate, preferably free of isocyanurate trimers of isophorone diisocyanate, with diols in a ratio of reactants which gives as isocyanto:hydroxyl ratio of about 1:0.5 to 1:0.9, preferably 1:0.6 to 1:0.8. The adduct preferably has a molecular weight of 1450 to 2800 and a melting point of about 85° to 120° C. The preferred diol reactant is 1,4-butanediol. Such an adduct is commercially available under the name Hüls BF1540.

In the β-hydroxylalkyl amide systems above, it is further preferred that a catalyst comprised of a carboxylate salt of a metal such as zinc, aluminum, or titanium, or an oxide of aluminum or zinc is present. Especially preferred as a catalyst is zinc stearate. Further description of catalyst systems for an activated β-hydroxylalkyl amide system can be found in U.S. application Ser. No. 08/084,104, incorporated herein by reference.

The amount of the blocked isocyanate cross-linking compound (or other-crosslinker) present in the compositions of this invention can be varied depending on several factors such as those mentioned above relative to the amount of component (A) which is utilized and its hydroxyl number. Typically, the amount of cross-linking compound which will effectively cross-link the polymers to produce coatings having a good combination of properties is in the range of about 5 to 30 weight percent, preferably 15 to 25 weight percent, based on the total weight of component (A).

The powder coating compositions of this invention may be prepared from the compositions described herein by dry-mixing and then melt-blending components (A) and (B), and optionally a cross-linking catalyst, along with other additives commonly used in powder coatings, and then grinding the solidified blend to a particle size, e.g., an average particle size in the range of about 10 to 300 microns, suitable for producing powder coatings. For example, the ingredients of the powder coating composition may be dry blended and then melt blended in a Brabender extruder at 90° to 130° C., granulated and finally ground. The melt blending should be carried out at a temperature sufficiently low to prevent the unblocking of the polyisocyanate cross-linking compound and thus avoiding premature cross-linking.

The powder coating compositions preferably contain a flow aid, also referred to as flow control or leveling agents, to enhance the surface appearance of cured coatings of the powder coating compositions. Such flow aids typically comprise acrylic polymers and are available from several suppliers, e.g., MODAFLOW from Monsanto Company and ACRONAL from BASF. Other flow control agents which may be used include MODAREZ MFP available from SYNTHRON, EX 486 available from Troy Chemical, BYK 360P available from BYK Mallinkrodt and PERENOL F-30-P available from Henkel. An example of one specific flow aid is an acrylic polymer having a molecular weight of about 17,000 and containing 60 mole percent 2-ethylhexyl methacrylate residues and about 40 mole percent ethyl acrylate residues. The amount of flow aid present may preferably be in the range of about 0.5 to 4.0 weight percent, based on the total weight of the resin component, and the cross-linking agent.

The powder coating compositions may be deposited on various metallic and non-metallic (e.g., thermoplastic or thermoset composite) substrates by known techniques for powder deposition such as by means of a powder gun, by electrostatic deposition or by deposition from a fluidized bed. In fluidized bed sintering, a preheated article is immersed into a suspension of the powder coating in air. The particle size of the powder coating composition normally is in the range of 60 to 300 microns. The powder is maintained in suspension by passing air through a porous bottom of the fluidized bed chamber. The articles to be coated are preheated to about 250° to 400° F. (about 121° to 205° C.) and then brought into contact with the fluidized bed of the powder coating composition. The contact time depends on the thickness of the coating that is to be produced and typically is from 1 to 12 seconds. The temperature of the substrate being coated causes the powder to flow and thus fuse together to form a smooth, uniform, continuous, uncratered coating. The temperature of the preheated article also effects cross-linking of the coating composition and results in the formation of a tough coating having a good combination of properties. Coatings having a thickness between 200 and 500 microns may be produced by this method.

The compositions also may be applied using an electrostatic process wherein a powder coating composition having a particle size of less than 100 microns, preferably about 15 to 50 microns, is blown by means of compressed air into an applicator in which it is charged with a voltage of 30 to 100 kV by high-voltage direct current. The charged particles then are sprayed onto the grounded article to be coated to which the particles adhere due to the electrical charge thereof. The coated article is heated to melt and cure the powder particles. Coatings of 40 to 120 microns thickness may be obtained.

Another method of applying the powder coating compositions is the electrostatic fluidized bed process which is a combination of the two methods described above. For example, annular or partially annular electrodes are mounted in the air feed to a fluidized bed so as to produce an electrostatic charge such as 50 to 100 kV. The article to be coated, either heated, e.g., 250° to 400° F., or cold, is exposed briefly to the fluidized powder. The coated article then can be heated to effect cross-linking if the article was not preheated to a temperature sufficiently high to cure the coating upon contact of the coating particles with the article.

The powder coating compositions of this invention may be used to coat articles of various shapes and sizes constructed of heat-resistance materials such as glass, ceramic and various metal materials. The compositions are especially useful for producing coatings on articles constructed of metals and metal alloys, particularly steel articles.

Further examples of formulation methods, additives, and methods of powder coating application may be found in *User's Guide to Powder Coating,* 2nd Ed., Emery Miller, editor, Society of Manufacturing Engineers, Dearborn, (1987).

The inherent viscosity (I.V.), in dL/g are determined in phenol/tetrachloroethane (60/40 w/w) at a concentration of 0.5 g/100 ml and a temperature of 25° C.

The resin melt viscosity, in poise, are determined using an ICI melt viscometer at 200° C.

The acid (i.e., carboxyl) number and hydroxyl number are determined by titration and reported as mg of KOH consumed for each gram of resin.

The glass transition temperature (Tg), is determined by differential scanning calorimetry (DSC) on the second heating cycle scanning at 20° C./minute after the sample has been heated to melt and quenched to below the resin Tg. Tg values are reported as midpoint.

The weight average molecular weight (Mw) and number average molecular weight (Mn) are determined by gel permeation chromatography in tetrahydrofuran (THF) using polystyrene standard and a UV detector.

Impact strengths are determined using a Gardner Laboratory, Inc., impact tester per ASTM D 2794-84.

Pencil hardness is determined using ASTM D 3363-74. The hardness is reported as the hardest pencil which will not cut into the coating. The results are expressed according to the following scale: (softest) 6B, 5B, 4B, 3B, 2B, B, HB, F, H, 2H, 3H, 4H, 5H, 6H (hardest).

The conical mandrel is performed using a Gardener Laboratory Inc., conical mandrel of specified size according to ASTM-522.

The 20 and 60 degree gloss are measured using a gloss meter (Gardener Laboratory, Inc. Model GC-9095) according to ASTM D-523.

The QUV resistance is measured by the loss of gloss. QUV is run by alternately exposing the coated panel at 45° C. to a 313 nm fluorescent tube for 8 hours followed by a condensation at 45° C. for 4 hours. Gloss is monitored every 100 hours of exposure. The number of hours needed to reduce the gloss to 50% of the original is reported.

The coatings of this invention are further illustrated by the following examples.

EXPERIMENTAL SECTION

EXAMPLE 1

To a 500 ml, 3-neck round bottom flask were added 2,6-decahydronaphthalene dimethanol (148.1 g, 0.748 moles), trimethylolpropane (5.3 g, 0.039 moles) and FAS- CAT 4100 catalyst (0.25 g) and IRGANOX 1010 antioxidant (Ciba Geigy) (0.25 g). The contents were heated to melt at 180° C. and 1,4-cyclo-hexanedicarboxylic acid (122.2 g, 0.710 moles) was added. The flask was swept with 1.0 scfh nitrogen while the temperature was raised from 180° C. to 230° C. over a 6-hour period. The batch temperature was maintained at 230° C. for 8 hours. The molten resin was poured to a syrup can where it cooled to a solid with the following properties:

| I.V., (dL/g) | 0.212 |
|---|---|
| ICI Melt Viscosity at 200° C. (poise) | |
| Acid Number | 3.0 |
| Hydroxyl number | 42 |
| DSC (2nd cycle) | 56 |
| Tg, (°C.) | |
| Gel permeation chromatography | |
| Mw | 11098 |
| Mn | 4151 |

EXAMPLE 2

To a 500 ml, 3-neck round bottom flask were added 2,6-decahydronaphthalene dimethanol (148.1 g, 0.748 moles), trimethylolpropane (5.3 g, 0.039 moles) and FAS-CAT 4100 (0.25 g) and IRGANOX 1010 antioxidant (0.25 g). The contents were heated to melt at 180° C. and 1,2-cyclohexanedicarboxylic acid (122.2 g, 0.710 moles) was added. The flask was swept with 1.0 scfh (standard cubic feet per hour) nitrogen while the temperatures was raised from 180° C. to 230° C. over a 6-hour period. The batch temperature was maintained at 230° C. for 8 hours. The molten resin was poured to a syrup can where it cooled to a solid with the following properties:

| I.V., (dL/g) | 0.212 |
|---|---|
| ICI Melt Viscosity at 200° C. (poise) | |
| Acid Number | 6.2 |
| Hydroxyl number | 29 |
| DSC (2nd cycle) | 67 |
| Tg, (°C.) | |
| Gel permeation chromatography | |
| Mw | 14870 |
| Mn | 3583 |

EXAMPLE 3

To a 500 ml, 3-neck round bottom flask were added 2,6-decahydronaphthalene dimethanol (148.1 g, 0.748 moles), trimethylolpropane (5.3 g, 0.039 moles) and FAS-CAT 4100 (0.25 g) and IRGANOX 1010 antioxidant (0.25 g). The contents were heated to melt at 180° C. and 1,4-cyclohexanedicarboxylic acid (122.2 g, 0.710 moles) was added. The flask was swept with 1.0 scfh nitrogen while the temperatures was raised from 180° C. to 230° C. over a 6-hour period. The batch temperature was maintained at 230° C. for 8 hours. The molten resin was poured to a syrup can where it cooled to a solid with the following properties:

| I.V., (dL/g) | 0.261 |
|---|---|
| ICI Melt Viscosity at 200° C. (poise) | |
| Acid Number | 0.6 |
| Hydroxyl number | 33 |
| DSC (2nd cycle) | 59 |
| Tg, (°C.) | |

EXAMPLE 4

To a 500 ml, 3-neck round bottom flask were added 2,6-decahydronaphthalene dimethanol (148.1 g, 0.748 moles), trimethylolpropane (5.3 g, 0.039 moles) and FAS-CAT 4100 catalyst (0.25 g) and IRGANOX 1010 antioxidant (0.25 g). The contents were heated to melt at 180° C. and 1,2-cyclohexanedicarboxylic anhydride (109.4 g, 0.710 moles) was added. The flask was swept with 1.0 scfh nitrogen while the temperatures was raised from 180° C. to 230° C. over a 6-hour period. The batch temperature was maintained at 230° C. for 8 hours. The molten resin was poured to a syrup can where it cooled to a solid with the following properties:

| I.V., (dL/g) | 0.253 |
|---|---|
| ICI Melt Viscosity at 200° C. (poise) | |
| Acid Number | 1.1 |
| Hydroxyl number | 40 |
| DSC (2nd cycle) | 63 |
| Tg, (°C.) | |
| Gel permeation chromatography | |
| Mw | 6720 |
| Mn | 1845 |

EXAMPLE 5

To a 500 ml, 3-neck round bottom flask were added 2,6-decahydronaphthalene dimethanol (136.0 g, 0.691 moles), trimethylolpropane (1.9 g, 0.014 moles) and FAS-CAT 4100 catalyst (0.25 g) and IRGANOX 1010 antioxidant (0.25 g). The contents were heated to melt at 180° C. and 1,4-cyclohexanedicarboxylic acid (122.6 g, 0.796 moles) was added. The flask was swept with 1.0 scfh nitrogen while the temperature was raised from 180° C. to 230° C. over a 6-hour period. The batch temperature was maintained at 230° C. for 8 hours. 1,2-Cyclohexanedicarboxylic acid was then added (30.0 g, 0.192 moles) and the melt stirred for four hours. The molten resin was poured to a syrup can where it cooled to a solid with the following properties:

| I.V., (dL/g) | 0.207 |
|---|---|
| ICI Melt Viscosity at 200° C. (poise) | |
| Acid Number | 44 |
| Hydroxyl number | 0 |
| DSC (2nd cycle) | 56 |
| Tg, (°C.) | |
| Gel permeation chromatography | |
| Mw | 7764 |
| Mn | 2452 |

EXAMPLE 6

To a 500 ml, 3-neck round bottom flask were added 2,6-decahydronaphthalene dimethanol (136.0 g, 0.691 moles), trimethylolpropane (1.9 g, 0.014 moles) and FAS-CAT 4100 catalyst (0.25 g) and IRGANOX 1010 antioxidant (0.25 g). The contents were heated to melt at 180° C. and 1,2-cyclohexanedicarboxylic anhydride (122.6 g, 0.796 moles) was added. The flask was swept with 1.0 scfh nitrogen while the temperatures was raised from 180° C. to 230° C. over a 6-hour period. The batch temperature was maintained at 230° C. for 8 hours. The molten resin was poured to a syrup can where it cooled to a solid with the following properties:

| I.V., (dL/g) | 0.216 |
|---|---|
| ICI Melt Viscosity at 200° C. (poise) | |
| Acid Number | 38 |
| Hydroxyl number | 0 |
| DSC (2nd cycle) | 70 |
| Tg, (°C.) | |
| Gel permeation chromatography | |
| Mw | 7262 |
| Mn | 413 |

EXAMPLE 7

A powder coating composition was prepared from the following materials:

| 160.0 g | Polyester of Example 1 |
|---|---|
| 40.0 g | HULS 1530 crosslinker |
| 100.0 g | Titanium dioxide |
| 2.0 | Dibutyltin dilaurate |
| 3.0 g | MODAFLOW 2000 |
| 2.0 g | Benzoin |
| 2.0 g | TINUVIN 144 |
| 3.0 g | TINUVIN 234 |

The above material was mixed in a Vitamix mixer and compounded in an APV extruder at 130° C. The extrudate was cooled, granulated, and pulverized in a Bantam mill with liquid nitrogen bled into the grinding chamber. The powder was classified through a 200 mesh screen.

The powder was electrostatically applied to a 3 in.×9 in. metal panel and cured in a 350° F. oven for 20 minutes. The film properties are as follows:

| Film thickness, Mil | 1.9 |
|---|---|
| Impact strength, (in.-lb) | |
| Front | 20 |
| Reverse | <20 |
| Pencil Hardness | H |
| Gloss | |
| 20 deg | 54 |
| 60 deg | 87 |
| MEK double rubs | 200+ |
| QUV, hours to 50% loss | 700 |

EXAMPLE 8

A powder coating composition was prepared from the following materials:

| 160.0 g | Polyester of Example 2 |
|---|---|
| 40.0 g | HULS 1530 |
| 100.0 g | Titanium dioxide |
| 2.0 | Dibutyltin dilaurate |
| 3.0 g | MODAFLOW 2000 |
| 2.0 g | Benzoin |
| 2.0 g | TINUVIN 144 |
| 3.0 g | TINUVIN 234 |

The above material was mixed in a Vitamix mixer and compounded in an APV extruder at 130° C. The extrudate was cooled, granulated, and pulverized in a Bantam mill with liquid nitrogen bled into the grinding chamber. The powder was classified through a 200 mesh screen.

The powder was electrostatically applied to a 3 in.×9 in. metal panel and cured in a 350° F. oven for 20 minutes. The film properties are as follows:

| Film thickness, Mil | 1.6 |
|---|---|
| Impact strength, (in.-lb) | |
| Front | 20 |
| Reverse | <20 |
| Pencil Hardness | 3H |
| Gloss | |
| 20 deg | 79 |
| 60 deg | 93 |
| MEK double rubs | 200+ |
| QUV, hours to 50% loss | 1530 |

EXAMPLE 9

A powder coating composition was prepared from the following materials:

| 164.0 g | Polyester of Example 3 |
|---|---|
| 36.0 g | HULS 1540 Crosslinker |
| 100.0 g | Titanium dioxide |
| 2.0 | Dibutyltin dilaurate |
| 3.0 g | MODAFLOW 2000 |
| 2.0 g | Benzoin |
| 2.0 g | TINUVIN 144 |
| 3.0 g | TINUVIN 234 |

The above material was mixed in a Vitamix mixer and compounded in an APV extruder at 130° C. The extrudate was cooled, granulated, and pulverized in a Bantam mill with liquid nitrogen bled into the grinding chamber. The powder was classified through a 200 mesh screen.

The powder was electrostatically applied to a 3 in.×9 in. metal panel and cured in a 350° F. oven for 20 minutes. The film properties are as follows:

| Film thickness, Mil | 1.8 |
|---|---|
| Impact strength, (in.-lb) | |
| Front | 20 |
| Reverse | <20 |
| Pencil Hardness | F |
| Gloss | |
| 20 deg | 76 |
| 60 deg | 95 |
| MEK double rubs | 200+ |
| QUV, hours to 50% loss | 1100 |

EXAMPLE 10

A powder coating composition was prepared from the following materials:

| 164.0 g | Polyester of Example 4 |
|---|---|
| 36.0 g | HULS 1540 Crosslinker |
| 100.0 g | Titanium dioxide |
| 2.0 | Dibutyltin dilaurate |
| 3.0 g | MODAFLOW 2000 |
| 2.0 g | Benzoin |
| 2.0 g | TINUVIN 144 |
| 3.0 g | TINUVIN 234 |

The above material was mixed in a Vitamix mixer and compounded in an APV extruder at 130° C. The extrudate was cooled, granulated, and pulverized in a Bantam mill with liquid nitrogen bled into the grinding chamber. The powder was classified through a 200 mesh screen.

The powder was electrostatically applied to a 3 in.×9 in. metal panel and cured in a 350° F. oven for 20 minutes. The film properties are as follows:

| Film thickness, Mil | 1.8 |
|---|---|
| Impact strength, (in.-lb) | |
| Front | 20 |
| Reverse | <20 |
| Pencil Hardness | H |
| Gloss | |
| 20 deg | 79 |
| 60 deg | 95 |
| MEK double rubs | 200+ |
| QUV, hours to 50% loss | 1700 |

EXAMPLE 11

A powder coating composition was prepared from the following materials:

| 186.0 g | Polyester of Example 5 |
|---|---|
| 14.0 g | PRIMID XL552 |
| 100.0 g | Titanium dioxide |
| 3.0 g | MODAFLOW 2000 |
| 0.5 g | Benzoin |
| 2.0 g | TINUVIN 144 |
| 4.0 g | TINUVIN 234 |

The above material was mixed in a Vitamix mixer and compounded in an APV extruder at 130° C. The extrudate was cooled, granulated, and pulverized in a Bantam mill with liquid nitrogen bled into the grinding chamber. The powder was classified through a 200 mesh screen.

The powder was electrostatically applied to a 3 in.×9 in. metal panel and cured in a 350° F. oven for 20 minutes. The film properties are as follows:

| Film thickness, Mil | 1.8 |
|---|---|
| Impact strength, (in.-lb) | |
| Front | <20 |
| Reverse | <20 |
| Pencil Hardness | F |
| Gloss | |
| 20 deg | 52 |
| 60 deg | 92 |
| MEK double rubs | 200+ |
| QUV, hours to 50% loss | 670 |

EXAMPLE 12

A powder coating composition was prepared from the following materials:

| 186.0 g | Polyester of Example 6 |
|---|---|
| 14.0 g | PRIMID XL552 |
| 100.0 g | Titanium dioxide |
| 3.0 g | MODAFLOW 2000 |
| 0.5 g | Benzoin |
| 2.0 g | TINUVIN 144 |
| 4.0 g | TINUVIN 234 |

The above material was mixed in a Vitamix mixer and compounded in an APV extruder at 130° C. The extrudate was cooled, granulated, and pulverized in a Bantam mill with liquid nitrogen bled into the grinding chamber. The powder was classified through a 200 mesh screen.

The powder was electrostatically applied to a 3 in.×9 in. metal panel and cured in a 350° F. oven for 20 minutes. The film properties are as follows:

| Film thickness, Mil | 2.2 |
|---|---|
| Impact strength, (in.-lb) | |
| Front | 20 |
| Reverse | <20 |
| Pencil Hardness | H |
| Gloss | |
| 20 deg | 65 |
| 60 deg | 93 |
| MEK double rubs | 200+ |
| QUV, hours to 50% loss | 2300 |

We claim:

1. A thermosetting powder coating composition comprising

A) an aliphatic polyester comprised of 80 to 100 weight percent of diacid residues selected from the group consisting of residues of 1,2-cyclohexanedicarboxylic acid, 1,3-cyclohexanedicarboxylic acid, and 1,4-cyclohexanedicarboxylic acid and from about 80 to 100 weight percent of residues of 2,6-decahydronaphthalene dimethanol, said polyester having a number average molecular weight (Mn) of from about 1,500 to about 10,000, a glass transition temperature (Tg) of about 45° C. to 100° C., and hydroxyl or acid number of from about 20 to about 100;

B) a crosslinking effective amount of a crosslinker reactive with said polyester.

2. The composition of claim 1, wherein the diacid residue is a residue of 1,2-cyclohexanedicarboxylic acid.

3. The composition of claim 1, wherein the diacid residue is a residue of 1,3-cyclohexanedicarboxylic acid.

4. The composition of claim 1, wherein the diacid residue is a residue of 1,4-cyclohexanedicarboxylic acid.

5. The composition of claim 1, wherein the acid number of said polyester is 20–100 and the hydroxyl number is less than 15.

6. The composition of claim 1, wherein the hydroxyl number of said polyester is 20–100 and the acid number is less than 15.

7. The composition of claim 5, wherein the cross-linking agent is triglycidyl isocyanurate or a β-hydroxyl alkylamide.

8. The composition of claim 6, wherein the cross-linking agent is a blocked isocyanate.

9. A thermosetting powder coating composition comprising

A) an aliphatic polyester comprised of 90 to 100 weight percent of diacid residues selected from the group consisting of residues of 1,2-cyclohexanedicarboxylic acid, 1,3-cyclohexanedicarboxylic acid, and 1,4-cyclohexanedicarboxylic acid and from about 90 to 100 weight percent of residues of 2,6-decahydronaphthalene dimethanol, said polyester having a number average molecular weight (Mn) of from about 2000 to about 6000, a glass transition temperature (Tg) of about 50° C. to 80° C., and a hydroxyl or acid number of from about 30 to about 80;

B) a crosslinking effective amount of a crosslinker reactive with said polyester.

10. The composition of claim 9, wherein the diacid residue is a residue of 1,2-cyclohexanedicarboxylic acid.

11. The composition of claim 9, wherein the diacid residue is a residue of 1,3-cyclohexanedicarboxylic acid.

12. The composition of claim 9, wherein the diacid residue is a residue of 1,4-cyclohexanedicarboxylic acid.

13. The composition of claim 9, wherein the acid number of said polyester is 30–80 and the hydroxyl number is less than 15.

14. The composition of claim 9, wherein the hydroxyl number of said polyester is 30–80 and the acid number is less than 15.

15. The composition of claim 13, wherein the crosslinking agent is triglycidyl isocyanurate or a β-hydroxyl alkylamide.

16. The composition of claim 14, wherein the crosslinking agent is a blocked isocyanate.

17. A shaped or formed article coated with the cured composition of claim 1.

18. A shaped or formed article coated with the cured composition of claim 9.

* * * * *